US011378957B1

(12) United States Patent
Cheng et al.

(10) Patent No.: US 11,378,957 B1
(45) Date of Patent: Jul. 5, 2022

(54) METHOD AND APPARATUS FOR CONTROLLING VEHICLE DRIVING

(71) Applicant: Beijing Baidu Netcom Science And Technology Co., LTD., Beijing (CN)

(72) Inventors: Xinjing Cheng, Beijing (CN); Ruigang Yang, Beijing (CN); Yajue Yang, Beijing (CN); Feixiang Lu, Beijing (CN); Hao Xu, Beijing (CN)

(73) Assignee: Beijing Baidu Netcom Science And Technology Co., Ltd., Beijing (CN)

( * ) Notice: Subject to any disclaimer, the term of this patent is extended or adjusted under 35 U.S.C. 154(b) by 309 days.

(21) Appl. No.: 16/677,321

(22) Filed: Nov. 7, 2019

(30) Foreign Application Priority Data

Jan. 25, 2019 (CN) .......................... 201910075036.9

(51) Int. Cl.
*G05D 1/00* (2006.01)
*G05D 1/02* (2020.01)

(52) U.S. Cl.
CPC ......... *G05D 1/0088* (2013.01); *G05D 1/0212* (2013.01); *G05D 1/0278* (2013.01)

(58) Field of Classification Search
CPC ..... G05D 1/008; G05D 1/0212; G05D 1/0278
USPC .......................................................... 701/23
See application file for complete search history.

(56) References Cited

U.S. PATENT DOCUMENTS

| 10,921,816 | B2* | 2/2021 | Myeong | G05D 1/024 |
|---|---|---|---|---|
| 11,130,630 | B2* | 9/2021 | Paschall, II | B65G 1/0492 |
| 2013/0151062 | A1* | 6/2013 | Lee | G05D 1/0278 701/26 |
| 2019/0138007 | A1* | 5/2019 | Baghsorkhi | G08G 1/091 |
| 2020/0034620 | A1* | 1/2020 | Lutterodt | G01C 11/06 |
| 2020/0036720 | A1* | 1/2020 | Butler | G06Q 20/32 |
| 2020/0109954 | A1* | 4/2020 | Li | G05D 1/0274 |
| 2020/0117201 | A1* | 4/2020 | Oetken | G06K 9/0063 |
| 2020/0208994 | A1* | 7/2020 | Askeland | G01C 21/30 |

FOREIGN PATENT DOCUMENTS

| CN | 105318888 A | 2/2016 |
|---|---|---|
| CN | 108375976 A | 8/2018 |
| CN | 108931971 A | 12/2018 |
| JP | 2017-013653 | 1/2017 |
| KR | 10-2017-0083233 | 7/2017 |

* cited by examiner

*Primary Examiner* — Yazan A Soofi
(74) *Attorney, Agent, or Firm* — Nixon Peabody LLP (57) ABSTRACT

Embodiments of the present disclosure relate to a method and apparatus for controlling vehicle driving. The method includes: generating a global path of a driving site of a vehicle; executing following controlling: generating a local path of a site in front of a current position of the vehicle based on the global path, the local path following a direction of the global path, controlling the vehicle to drive along the local path until reaching an end point of the local path, determining whether the vehicle reaches an end point of the global path, and terminating the controlling if the vehicle reaches the endpoint of the global path; and continuing, in response to determining the vehicle failing to reach the end point of the global path, executing the controlling.

18 Claims, 4 Drawing Sheets

METHOD AND APPARATUS FOR CONTROLLING VEHICLE DRIVING

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes

TECHNICAL FIELD

Embodiments of the present disclosure relate to the field of autonomous driving technology, and specifically to a method and apparatus for controlling vehicle driving.

BACKGROUND

An autonomous vehicle is a novel intelligent vehicle, accurately controls, computes, and analyzes all parts of the vehicle mainly through a control apparatus (e.g., a vehicle-mounted smart controller), and finally issues an instruction via an ECU (electronic control unit) to control different devices of the autonomous vehicle respectively, thereby achieving fully automatic running of the vehicle, and achieving the goal of autonomous driving of the vehicle.

To achieve the goal of autonomous driving of the vehicle, it is necessary to pre-plan a driving path, to control autonomous driving of the autonomous vehicle along the driving path. At present, the conventional approach of controlling vehicle driving is to provide a laser sensor on the autonomous vehicle, plan a driving path using a wide range of coarse-grained perceptual information sensed by the laser sensor, and control autonomous driving of the vehicle along the driving path.

SUMMARY

Embodiments of the present disclosure propose a method and apparatus for controlling vehicle driving.

In a first aspect, an embodiment of the present disclosure provides a method for controlling vehicle driving, including: generating a global path of a driving site of a vehicle; executing following controlling: generating a local path of a site in front of a current position of the vehicle based on the global path, the local path following a direction of the global path, controlling the vehicle to drive along the local path until reaching an end point of the local path, determining whether the vehicle reaches an end point of the global path, and terminating the controlling in response to determining the vehicle reaching the end point of the global path; and continuing, in response to determining the vehicle failing to reach the end point of the global path, executing the controlling.

In some embodiments, the generating a global path of a driving site of a vehicle includes: acquiring a two-dimensional image of the driving site; generating a global map based on the two-dimensional image of the driving site; and performing path planning based on the global map, to generate the global path.

In some embodiments, the generating a local path of a site in front of a current position of the vehicle based on the global path includes: acquiring a two-dimensional image of the site in front of the current position of the vehicle; generating a local map based on the two-dimensional image of the site in front of the current position of the vehicle; and performing path planning based on the global path and the local map, to generate the local path.

In some embodiments, the two-dimensional image of the driving site is obtained by a camera provided on an unmanned aerial vehicle through aerial photography, and the two-dimensional image of the site in front of the current position of the vehicle is obtained by a camera provided on the vehicle through photographing the site in front of the current position of the vehicle.

In some embodiments, the controlling the vehicle to drive along the local path until reaching an end point of the local path includes: determining a speed sequence of a chassis of the vehicle for driving along the local path; and controlling steering and displacement of the chassis based on the speed sequence, acquiring a current road haul of the chassis from a chassis odometer of the vehicle in real time, and performing closed loop control based on a road haul corresponding to a current speed in the speed sequence and the current road haul, such that the chassis drives along the local path.

In some embodiments, the determining whether the vehicle reaches an end point of the global path includes: acquiring the current road haul of the chassis and the two-dimensional image of the site in front of the current position of the vehicle; fusing the current road haul of the chassis and the two-dimensional image of the site in front of the current position of the vehicle to determine the current position of the vehicle; determining whether the current position is identical to an end point position of the global path; determining the vehicle reaching the end point of the global path, in response to determining that the current position is identical to the end point position of the global path; and determining the vehicle failing to reach the end point of the global path, in response to determining that the current position is not identical to the end point position of the global path.

In some embodiments, the local path meets at least one of following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path.

In some embodiments, the vehicle is an autonomous engineering vehicle.

In a second aspect, an embodiment of the present disclosure provides an apparatus for controlling vehicle driving, including: a generating unit configured to generate a global path of a driving site of a vehicle; a controlling unit configured to execute following controlling: generating a local path of a site in front of a current position of the vehicle based on the global path, the local path following a direction of the global path, controlling the vehicle to drive along the local path until reaching an end point of the local path, determining whether the vehicle reaches an end point of the global path, and terminating the controlling in response to determining the vehicle reaching the endpoint of the global path; and an iterating unit configured to continue, in response to determining the vehicle failing to reach the endpoint of the global path, executing the controlling.

In some embodiments, the generating unit includes: a first acquiring subunit configured to acquire a two-dimensional image of the driving site; a first generating subunit configured to generate a global map based on the two-dimensional image of the driving site; and a second generating subunit configured to perform path planning based on the global map, to generate the global path.

In some embodiments, the controlling unit includes: a second acquiring subunit configured to acquire a two-dimensional image of the site in front of the current position of the vehicle; a third generating subunit configured to generate a local map based on the two-dimensional image of the site in front of the current position of the vehicle; and a fourth generating subunit configured to perform path planning based on the global path and the local map, to generate the local path.

In some embodiments, the two-dimensional image of the driving site is obtained by a camera provided on an unmanned aerial vehicle through aerial photography, and the two-dimensional image of the site in front of the current position of the vehicle is obtained by a camera provided on the vehicle through photographing the site in front of the current position of the vehicle.

In some embodiments, the controlling unit further includes: a first determining subunit configured to determine a speed sequence of a chassis of the vehicle for driving along the local path; and a controlling subunit configured to control steering and displacement of the chassis based on the speed sequence, acquire a current road haul of the chassis from a chassis odometer of the vehicle in real time, and perform closed loop control based on a road haul corresponding to a current speed in the speed sequence and the current road haul, such that the chassis drives along the local path.

In some embodiments, the controlling unit further includes: a third acquiring subunit configured to acquire the current road haul of the chassis and the two-dimensional image of the site in front of the current position of the vehicle; a fusing subunit configured to fuse the current road haul of the chassis and the two-dimensional image of the site in front of the current position of the vehicle to determine the current position of the vehicle; and a second determining subunit configured to determine whether the current position is identical to an end point position of the global path; determine the vehicle reaching the end point of the global path, in response to determining that the current position is identical to the end point position of the global path; and determine the vehicle failing to reach the end point of the global path, in response to determining that the current position is not identical to the end point position of the global path.

In some embodiments, the local path meets at least one of following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path.

In some embodiments, the vehicle is an autonomous engineering vehicle.

In a third aspect, an embodiment of the present disclosure provides an electronic device, including: one or more processors; and a storage apparatus, storing one or more programs thereon, where the one or more programs, when executed by the one or more processors, cause the one or more processors to implement the method according to any one implementation in the first aspect.

In a fourth aspect, an embodiment of the present disclosure provides a computer readable medium, storing a computer program thereon, where the computer program, when executed by a processor, implements the method according to any one implementation in the first aspect.

The method and apparatus for controlling vehicle driving provided in embodiments of the present disclosure first generate a global path of a driving site of a vehicle; and then execute following controlling: generating a local path of a site in front of a current position of the vehicle based on the global path, controlling the vehicle to drive along the local path until reaching an end point of the local path, and determining whether the vehicle reaches an end point of the global path. In response to determining that the vehicle reaches the end point of the global path, then the vehicle has autonomously driven to a destination. In this case, the controlling may be terminated. In response to determining that the vehicle fails to reach the end point of the global path, then the vehicle has not autonomously driven to the destination yet. In this case, the vehicle may return to continue executing the controlling, and iterate the processes, until the vehicle autonomously drives to the destination. The vehicle driving process is controlled by combining a coarse-grained global path with a fine-grained local path, thereby achieving fine control of the autonomous driving process of the vehicle.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
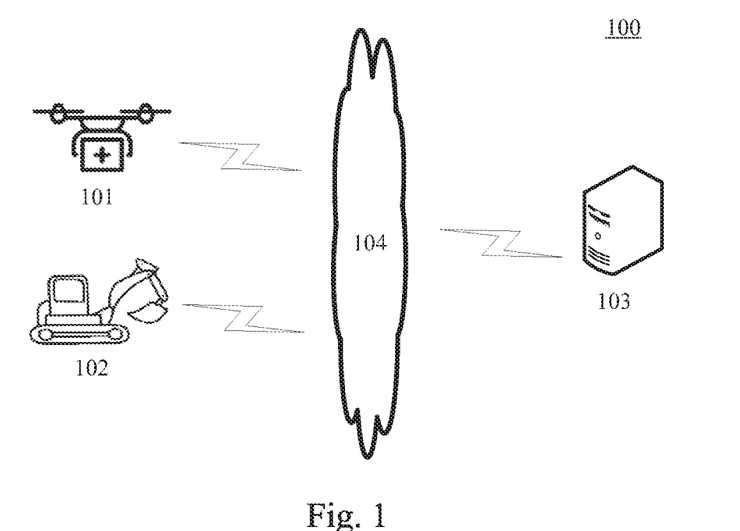
FIG. 1 is a diagram of an example system architecture in which embodiments of the present disclosure may be implemented.

FIG. 1 shows an example system architecture 100 in which a method for controlling vehicle driving or an apparatus for controlling vehicle driving of embodiments of the present disclosure may be implemented.

As shown in FIG. 1, the system architecture 100 may include an unmanned aerial vehicle 101, a vehicle 102, a server 103, and a network 104. The network 104 serves as a medium providing a communication link between the unmanned aerial vehicle 101, the vehicle 102, and the server 103. The network 104 may include various types of connections, such as wired or wireless communication links, or optical cables.

The unmanned aerial vehicle 101 may be provided with a camera for aerial photography of a two-dimensional image of a driving site of the vehicle 102. Generally, the camera provided on the unmanned aerial vehicle 101 may be a monocular camera for aerial photography of a monocular image of the driving site.

The vehicle 102 may be provided with a camera for photographing a two-dimensional image of a site in front of the vehicle 102. Generally, the camera provided on the vehicle 102 may be a binocular camera provided in the front of the vehicle 102 for photographing a binocular image of the site in front of the vehicle.

The server 103 may be a server providing various services, such as a back-end server of the vehicle 102. The back-end server of the vehicle 102 may acquire the two-dimensional image of the driving site obtained by the camera provided on the unmanned aerial vehicle 101 through aerial photography from the camera provided on the unmanned aerial vehicle, and process, e.g., analyze, the two-dimensional image of the driving site, to generate a global path. Then, the back-end server of the vehicle 102 may execute the following controlling: acquiring the two-dimensional image of the site in front of the vehicle photographed by the camera provided on the vehicle 102 from the camera provided on the vehicle, processing, e.g., analyzing, the two-dimensional image of the site in front of the vehicle to generate a local path, controlling the vehicle to drive along the local path until reaching an end point of the local path, and determining whether the vehicle reaches an endpoint of the global path. If the vehicle reaches the end point of the global path, then the controlling may be terminated. If the vehicle fails to reach the endpoint of the global path, then the vehicle continues executing the controlling, and iterates the processes, until the vehicle reaches the end point of the global path.

It should be noted that the server 103 may be hardware or software. When the server 103 is hardware, the server may be implemented as a distributed server cluster including a plurality of servers, or be implemented as a single server. When the server 103 is software, the server may be implemented as a plurality of software programs or software modules (e.g., software programs or software modules for providing distributed services), or be implemented as a single software program or software module. This is not specifically limited here.

It should be noted that the method for controlling vehicle driving provided by some embodiments of the present disclosure is generally executed by the server 103. Accordingly, the apparatus for controlling vehicle driving is generally provided in the server 103.

It should be understood that the numbers of unmanned aerial vehicles, vehicles, servers, and networks in FIG. 1 are merely illustrative. Any number of unmanned aerial vehicles, vehicles, servers, and networks may be provided based on actual requirements.

Figure 2:
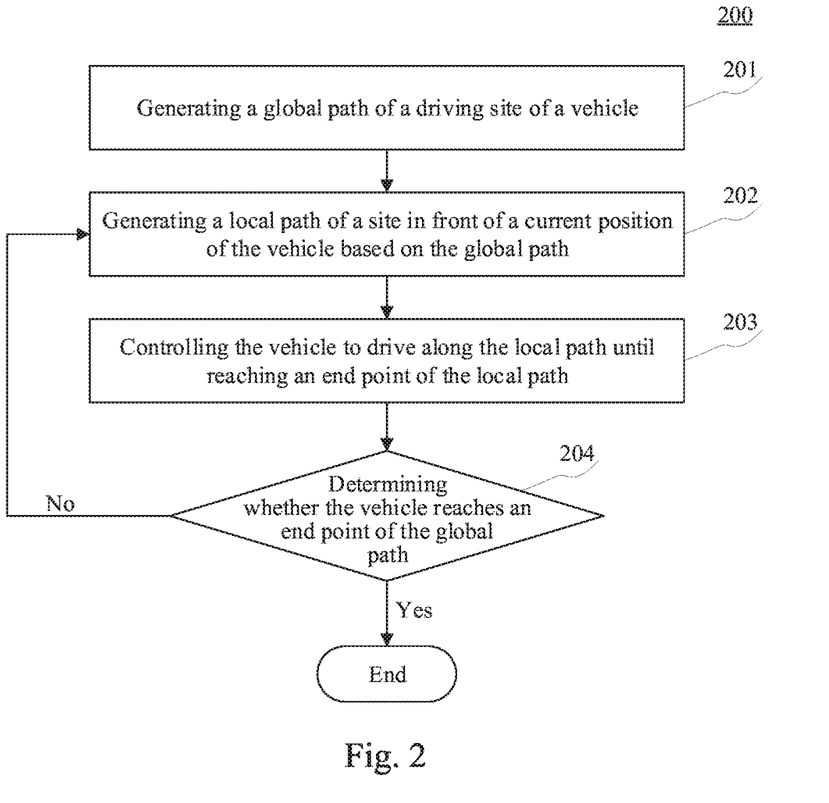
FIG. 2 is a flowchart of a method for controlling vehicle driving according to an embodiment of the present disclosure.

Further referring to FIG. 2, a process 200 of an embodiment of a method for controlling vehicle driving according to an embodiment of the present disclosure is shown. The method for controlling vehicle driving includes the following steps.

Step 201: generating a global path of a driving site of a vehicle.

In the present embodiment, an executing body (e.g., the server 103 shown in FIG. 1) of the method for controlling vehicle driving may generate the global path of the driving site of the vehicle. Generally, the executing body may perform global path planning based on a global map of the driving site, to generate the global path. The driving site may be a site in which the vehicle is driving, including an origin and a destination of the vehicle. The global path may be a collision-free path with the origin of the vehicle as a starting point, and the destination of the vehicle as an end point.

Step 202: generating a local path of a site in front of a current position of the vehicle based on the global path.

In the present embodiment, the executing body may analyze the global path, to generate the local path of the site in front of the current position of the vehicle. Generally, the executing body may generate the local path based on a sampling approach. Specifically, the executing body may sample a preset number (e.g., n) of points, such as $A_1, A_2, \ldots A_i,$ and $\ldots A_n$, on the global path. i is a positive integer, and $1 \leq i \leq n$, $A_i$ is an i-th sampling point, $A_1$ is the starting point of the global path, $A_n$ is the end point of the global path, and a path between any two adjacent sampling points is a local path. The current position of the vehicle may be a position of any one sampling point. The local path of the site in front of the current position of the vehicle may be a local path with a sampling point corresponding to the current position of the vehicle as the starting point and a sampling point adjacent to the sampling point corresponding to the current position of the vehicle as the end point. The site in front of the current position of the vehicle may be a site of an area in front of the current position of the vehicle, and is a part of site belonging to the driving site. Generally, the current position of the vehicle is on the edge of the site in front of the current position of the vehicle. The local path may be a collision-free path with the current position of the vehicle as the starting point, and the local path follows a direction of the global path.

It should be noted that the executing body may generate the global path and the local path using various path planning algorithms (e.g., SLAM (simultaneous localization and mapping), and VSLAM (visual simultaneous localization and mapping)), or generate the global path and the local path using various pre-trained deep neural networks (e.g., a multilayer convolutional neural network) for generating a driving path. The above various path planning algorithms and various deep neural networks for generating a driving path are well-known technologies that are widely researched and applied at present. The description will not be repeated here.

Step 203: controlling the vehicle to drive along the local path until reaching an end point of the local path.

In the present embodiment, the executing body may transmit a control instruction to a plurality of devices (e.g., a chassis) of the vehicle based on the local path, such that the vehicle autonomously drives along the local path until reaching the end point of the local path.

Step 204: determining whether the vehicle reaches an end point of the global path, terminating the controlling in response to determining that the vehicle reaches the end point of the global path, and continuing executing the controlling in response to determining that the vehicle fails to reach the end point of the global path.

In the present embodiment, the executing body may determine whether the vehicle reaches the endpoint of the global path. If the vehicle reaches the end point of the global path, then the vehicle has autonomously driven to a destination. In this case, the process may be terminated. If the vehicle fails to reach the end point of the global path, then the vehicle has not autonomously driven to the destination yet. In this case, the vehicle may return to continue executing step 202, and iterate the processes, until the vehicle autonomously drives to the destination. The controlling includes steps 202-204.

In some alternative implementations of the present embodiment, the vehicle may be provided with a GPS (Global Positioning System) locator. The executing body may first position the vehicle using the GPS locator to acquire the current position of the vehicle; then determine whether the current position is identical to an end point position of the global path; determine the vehicle reaching the end point of the global path, if the current position is identical to the end point position of the global path; and determine the vehicle failing to reach the end point of the global path, if the current position is not identical to the end point position of the global path.

In some alternative implementations of the present embodiment, the vehicle may be provided with a camera. Generally, the camera may be provided in the front of the vehicle, such that the camera provided on the vehicle may photograph the site in front of the current position of the vehicle. The vehicle may be further provided with a chassis odometer. Thus, the chassis odometer provided on the vehicle may acquire a current road haul of the chassis. Then, the executing body may acquire the current road haul of the chassis and the two-dimensional image of the site in front of the current position of the vehicle; fuse the current road haul of the chassis and the two-dimensional image of the site in front of the current position of the vehicle to determine the current position of the vehicle; determine whether the current position is identical to the end point position of the global path; determine the vehicle reaching the end point of the global path, if the current position is identical to the end point position of the global path; and determine the vehicle failing to reach the end point of the global path, if the current position is not identical to the endpoint position of the global path. The current road haul of the chassis is fused with the two-dimensional image of the site in front of the current position of the vehicle to improve the accuracy of the determined current position of the vehicle.

The method for controlling vehicle driving provided in some embodiments of the present disclosure first generates a global path of a driving site of a vehicle; and then executes following controlling: generating a local path of a site in front of a current position of the vehicle based on the global path, controlling the vehicle to drive along the local path until reaching an end point of the local path, and determining whether the vehicle reaches an endpoint of the global path. If the vehicle reaches the end point of the global path, then the vehicle has autonomously driven to a destination. In this case, the controlling may be terminated. If the vehicle fails to reach the endpoint of the global path, then the vehicle has not autonomously driven to the destination yet. In this case, the vehicle may return to continue executing the controlling, and iterate the processes, until the vehicle autonomously drives to the destination. The vehicle driving process is controlled by combining a coarse-grained global path with a fine-grained local path, thereby achieving fine control of the autonomous driving process of the vehicle.

Figure 3:
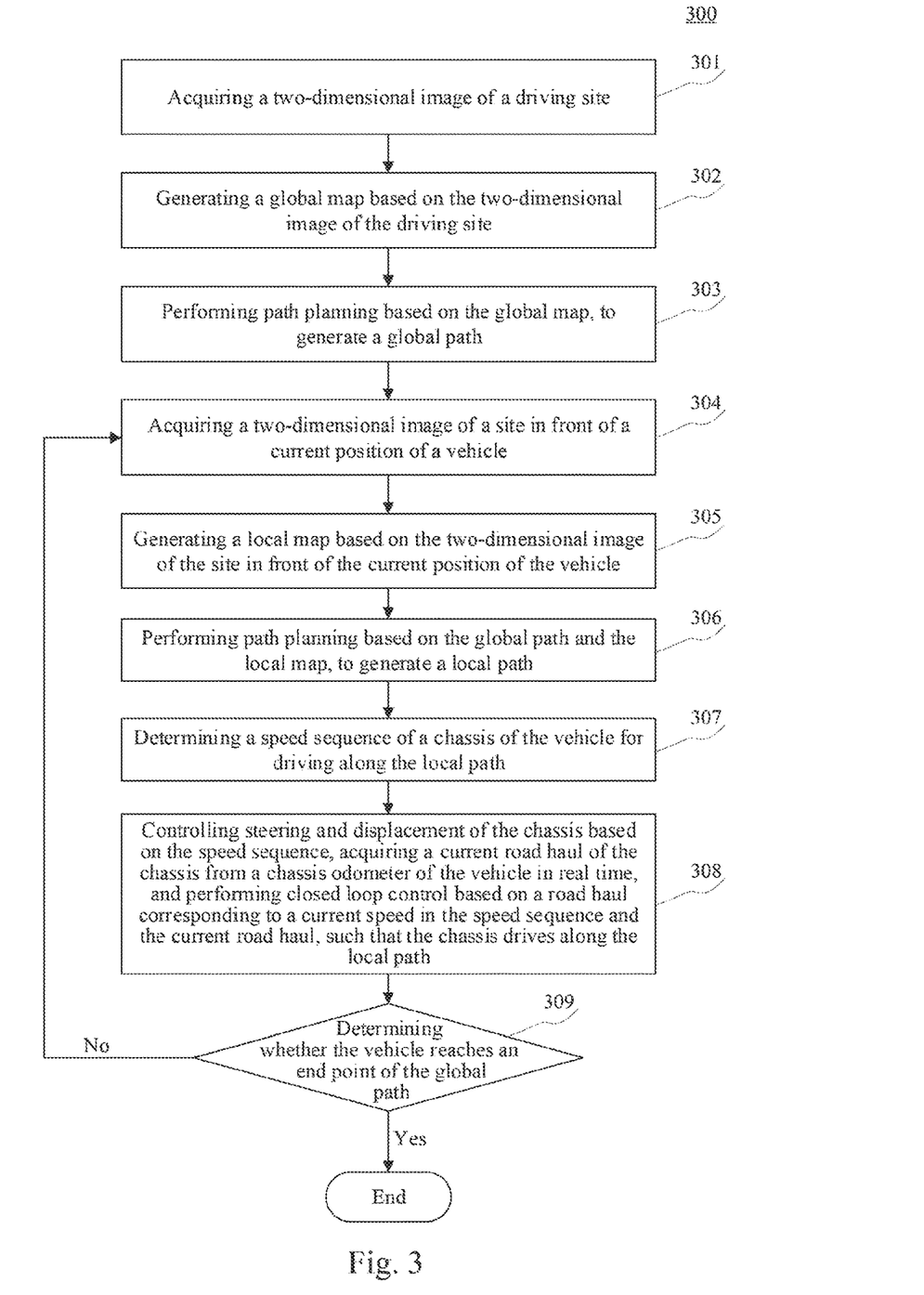
FIG. 3 is a flowchart of the method for controlling vehicle driving according to another embodiment of the present disclosure.

Further referring to FIG. 3, a process 300 of the method for controlling vehicle driving according to another embodiment of the present disclosure is shown. The method for controlling vehicle driving includes the following steps.

Step 301: acquiring a two-dimensional image of a driving site.

In the present embodiment, an executing body (e.g., the server 103 shown in FIG. 1) of the method for controlling vehicle driving may acquire the two-dimensional image of the driving site through a wired or wireless connection. The driving site may be a site in which the vehicle is driving, including an origin and a destination of the vehicle.

In some alternative implementations of the present embodiment, the two-dimensional image of the driving site may be an image of the driving site obtained by a camera provided on an unmanned aerial vehicle through aerial photography. In practice, the unmanned aerial vehicle may be provided with the camera, and when the unmanned aerial vehicle flies above the driving site, the camera provided thereon may be turned on for aerial photography of the driving site. Generally, the camera provided on the unmanned aerial vehicle may be a monocular camera, and the two-dimensional image of the driving site may be a monocular image.

Step 302: generating a global map based on the two-dimensional image of the driving site.

In the present embodiment, the executing body may analyze the two-dimensional image of the driving site, and generate a map of the driving site based on the analysis result of the two-dimensional image of the driving site, for use as the global map. The global map may be a three-dimensional model of the driving site, and may include the origin and the destination of the vehicle.

In some alternative implementations of the present embodiment, the camera provided on the unmanned aerial vehicle may photograph two-dimensional images of the driving site in a plurality of angles. Thus, the executing body may perform three-dimensional reconstruction using the two-dimensional images of the driving site in the plurality of angles, to obtain the global map.

In some alternative implementations of the present embodiment, the camera provided on the unmanned aerial vehicle may be the monocular camera. When the unmanned aerial vehicle flies above the driving site, the monocular camera provided thereon may be turned on for aerial photography of the driving site, to obtain the monocular image of the driving site. Thus, the executing body may perform three-dimensional reconstruction on the monocular image obtained by the monocular camera of the unmanned aerial vehicle through aerial photography, to obtain a three-dimensional model of the driving site; and then determine positions of the vehicle and the destination in the three-dimensional model of the driving site, and annotate the three-dimensional model of the driving site based on the determined positions, to generate the global map. An approach of the performing three-dimensional reconstruction of the monocular image may be an algorithm of a large scale structure from motion. The structure from motion (SFM) is a technology capable of automatically recovering camera parameters and a three-dimensional structure of a scenario from a plurality of images or a video sequence, and has wide applications, for example, may be applied to the fields, such as augmented reality, robots, and autonomous driving. The large scale structure from motion is the structure from motion for a large scale scenario.

Step 303: performing path planning based on the global map, to generate a global path.

In the present embodiment, the executing body may perform global path planning based on the global map, to generate the global path. The global path may be a collision-free path with the origin of the vehicle as a starting point, and the destination of the vehicle as an end point.

Step 304: acquiring a two-dimensional image of a site in front of a current position of a vehicle.

In the present embodiment, the executing body may acquire the two-dimensional image of the site in front of the current position of the vehicle through a wired or wireless connection. The site in front of the current position of the vehicle may be a site of an area in front of the current position of the vehicle, and is a part of site belonging to the driving site. Generally, the current position of the vehicle is on the edge of the site in front of the current position of the vehicle.

In some alternative implementations of the present embodiment, the two-dimensional image of the site in front of the current position of the vehicle may be an image obtained by a camera provided on the vehicle through photographing the site in front of the current position of the vehicle. In practice, the vehicle may be provided with the camera. Generally, the camera may be provided in the front of the vehicle, such that the camera provided on the vehicle may photograph the site in front of the current position of the vehicle. Generally, the camera provided on the vehicle may be a binocular camera, and the two-dimensional image of the site in front of the current position of the vehicle may be a binocular image.

Step 305: generating a local map based on the two-dimensional image of the site in front of the current position of the vehicle.

In the present embodiment, the executing body may analyze the two-dimensional image of the site in front of the current position of the vehicle, and generate a map of the site in front of the current position of the vehicle based on the analysis result of the two-dimensional image of the site in front of the current position of the vehicle, for use as the local map of the driving site. The local map may be a three-dimensional model of the site in front of the current position of the vehicle.

In some alternative implementations of the present embodiment, the camera provided on the vehicle may photograph two-dimensional images of the site in front of the current position of the vehicle in a plurality of angles. Thus, the executing body may perform three-dimensional reconstruction using the two-dimensional images of the site in front of the current position of the vehicle in the plurality of angles, to obtain the local map.

In some alternative implementations of the present embodiment, the camera provided on the vehicle may be the binocular camera. Generally, the binocular camera may be provided in the front of the vehicle, such that the binocular camera provided on the vehicle may photograph the site in front of the current position of the vehicle, to obtain the binocular image of the site in front of the current position of the vehicle. Thus, the executing body may first perform image matching on the binocular image to obtain a parallax map of the binocular image; then generate a depth map of the site in front of the current position of the vehicle based on the parallax map; and finally perform three-dimensional reconstruction on the depth map, to obtain the local map. Generally, since the binocular image is photographed by the binocular camera through imitating a working mechanism of the eyes of an animal, there is a certain degree of horizontal parallax between each group of binocular images. Thus, the executing body may determine a distance from the site in front of the current position of the vehicle to the binocular camera based on the horizontal parallax, i.e., obtaining a depth map of the site in front of the current position of the vehicle. Then, the executing body may perform three-dimensional reconstruction on the depth map using, for example, Kinect Fusion algorithm, to obtain the local map.

Step 306: performing path planning based on the global path and the local map, to generate a local path.

In the present embodiment, the executing body may perform local path planning based on the global path and the local map, to generate the local path. The local path may be a collision-free path with the current position of the vehicle as the starting point, and the local path follows a direction of the global path.

In practice, since the global path is generated based on coarse-grained information obtained by the camera provided on the unmanned aerial vehicle through aerial photography, and belongs to a coarse-grained path, its accuracy is low. Further, the global map may include not only static objects (e.g., a tree, and a material pile), but also dynamic objects (e.g., other vehicles, and people). Positions of the dynamic objects on the global map are positions at the moment when the unmanned aerial vehicle performs aerial photography of the driving site. The positions of the dynamic objects may continuously change over time. Based on the above two characteristics of the global path, if the vehicle autonomously drives along the global path, it is impossible to completely guarantee that the vehicle does not collide with an obstacle. Thus, the executing body further needs to generate the local path following the direction of the global path based on the local map and the global path. Since the local path is generated based on fine-grained information photographed by the camera provided on the vehicle, and belongs to a fine-grained path, its accuracy is high. At the same time, since the site in front of the current position of the vehicle is an area of a small scope in the driving site, it only takes very short time from the camera provided on the vehicle photographing the two-dimensional image of the site in front of the current position of the vehicle to the vehicle driving to an end point of the local path along the local path. In the meanwhile, the positions of the dynamic objects change a little. Based on the above two characteristics of the local path, if the vehicle autonomously drives along the local path, the vehicle generally will not collide with the obstacle.

In some alternative implementations of the present embodiment, the local path may generally meet at least one of the following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path, or the like.

Step 307: determining a speed sequence of a chassis of the vehicle for driving along the local path.

In the present embodiment, the executing body may analyze the local path, to determine the speed sequence of the chassis of the vehicle for driving along the local path. The speed sequence may include a speed of the chassis at each sampling point on the local path.

Step 308: controlling steering and displacement of the chassis based on the speed sequence, acquiring a current road haul of the chassis from a chassis odometer of the vehicle in real time, and performing closed loop control based on a road haul corresponding to a current speed in the speed sequence and the current road haul, such that the chassis drives along the local path.

In the present embodiment, for the current speed in the speed sequence, the executing body may control the steering and displacement of the chassis according to the current speed. At the same time, the executing body may further acquire the current road haul of the chassis from the chassis odometer in real time. Generally, if the current road haul of the chassis is equal to a road haul corresponding to the current speed in the speed sequence, then the chassis does not deviate from the local path. However, in an actual process, influenced by road friction and air resistance, the chassis will inevitably deviate from the local path. In this case, the executing body may perform closed loop control based on the road haul corresponding to the current speed in the speed sequence and the current road haul, such that the chassis smoothly drives onto the local path again. Then, a next speed of the current speed becomes a current speed to continue executing the above steps, which are iterated, until the executing body completes closed loop control based on a last speed in the speed sequence. In this case, the chassis drives to the endpoint of the local path along the local path.

Generally, the chassis of the vehicle may be provided with at least two driving wheels. Taking a vehicle with left and right driving wheels as an example, when the left and right driving wheels rotate at the same speed and in the same rotation direction, the chassis drives straight; when the left and right driving wheels rotate at the same speed and in opposite rotation directions, the chassis rotates in situ; and when the left and right driving wheels rotate at different speeds and/or in different rotation directions, the chassis makes a turn.

It should be noted that, when the chassis deviates from the local path, the executing body may control the chassis to drive onto the local path again by various approaches. For example, the executing body may establish a smooth curve based on a current position and orientation of the vehicle and a position and orientation corresponding to the current speed, and control the vehicle to drive along the smooth curve until returning to the local path. The executing body may further control the chassis to drive onto the local path again by other approaches. Here, the control approach is not limited.

Step 309: determining whether the vehicle reaches an end point of the global path, terminating the controlling in response to determining that the vehicle reaches the end point of the global path, and continuing executing the controlling in response to determining that the vehicle fails to reach the end point of the global path.

In the present embodiment, the executing body may determine whether the vehicle reaches the endpoint of the global path. If the vehicle reaches the end point of the global path, then the vehicle has autonomously driven to a destination. In this case, the process may be terminated. If the vehicle fails to reach the end point of the global path, then the vehicle has not autonomously driven to the destination yet. In this case, the vehicle may return to continue executing step 304, and iterate the processes, until the vehicle autonomously drives to the destination. The controlling includes steps 304-309.

In some alternative implementations of the present embodiment, the vehicle may be an autonomous engineering vehicle. For example, the autonomous engineering vehicle may be an autonomous excavator. In this case, the driving site may be a work site of the autonomous excavator. An origin of the autonomous excavator may be a current location of the autonomous excavator. A destination of the autonomous excavator may be a location of a material pile to be excavated by the autonomous excavator. The material pile may be formed by stacking materials. The materials mainly include soil, coal, silt, pre-loosened soil and rock, or the like.

Figure 4:
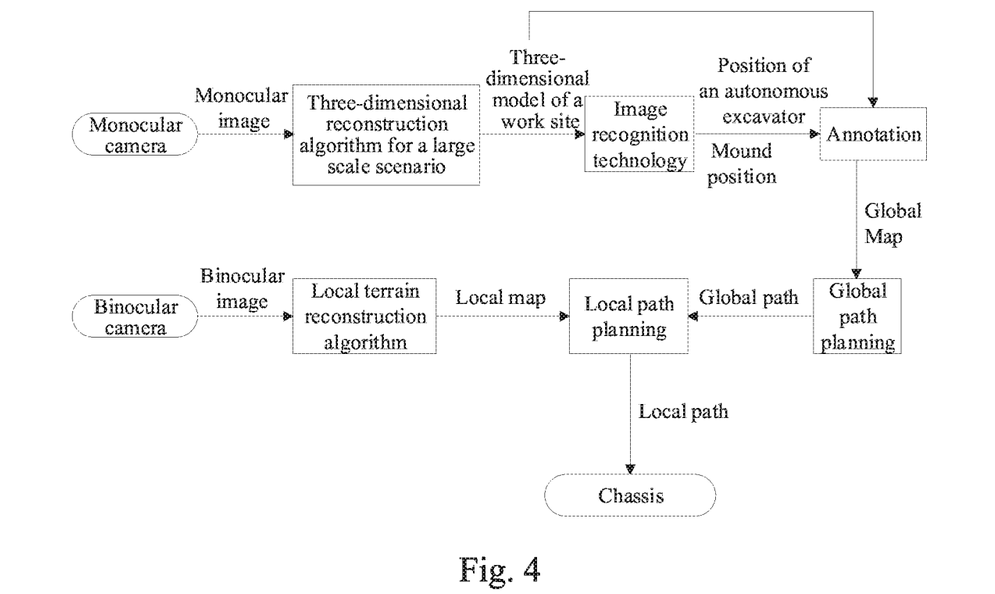
FIG. 4 is a schematic diagram of an application scenario of the method for controlling vehicle driving provided in FIG. 3.

Further referring to FIG. 4, FIG. 4 is a schematic diagram of an application scenario of the method for controlling vehicle driving provided in FIG. 3. In the application scenario shown in FIG. 4, an autonomous excavator needs to excavate a mound on a work site. First, an unmanned aerial vehicle is controlled to fly above the work site, turn on a monocular camera provided thereon for aerial photography of a monocular image of the work site, and transmit the monocular image to a back-end server of the autonomous excavator. Thus, the back-end server may perform three-dimensional reconstruction on the monocular image using a three-dimensional reconstruction algorithm for a large scale scenario, to obtain a three-dimensional model of the work site. A position of the autonomous excavator and a position of the mound in the three-dimensional model of the work site are identified using an image recognition technology, and the autonomous excavator and the mound in the three-dimensional model of the work site are annotated based on the identified positions, to generate a global map. Global path planning is performed based on the global map, to generate a global path. Then, a binocular camera provided in the front of the autonomous excavator body is turned on to photograph a binocular image of a site in front of the autonomous excavator body, and transmit the binocular image to the back-end server of the autonomous excavator. Thus, the back-end server may perform three-dimensional reconstruction on the binocular image using a local terrain reconstruction algorithm, to obtain a local map. Local path planning is performed based on the local map and the global path, to generate a local path following a direction of the global path. In this case, the back-end server may control a speed of a chassis of the autonomous excavator based on the local path, such that the autonomous excavator autonomously drives along the local path. When driving to an end point of the local path, the binocular camera is turned on again to photograph a site in front of the autonomous excavator, and the generating a local path is continued to be executed to generate a new local path. The speed of the chassis of the autonomous excavator is controlled based on the new local path, such that the autonomous excavator autonomously drives along the new local path. The processes are iterated, until the autonomous excavator drives to a position near the mound.

As can be seen from FIG. 3, compared with the corresponding embodiment of FIG. 2, the process 300 of the method for controlling vehicle driving in the present embodiment highlights the generation of the global path and the local path. Thus, three-dimensional reconstruction is performed on the two-dimensional image of the driving site to generate the global map. Moreover, three-dimensional reconstruction is performed on the two-dimensional image of the site in front of the autonomous excavator to generate the local map, thereby improving the efficiency and accuracy in generating the global map and the local map.

Figure 5:
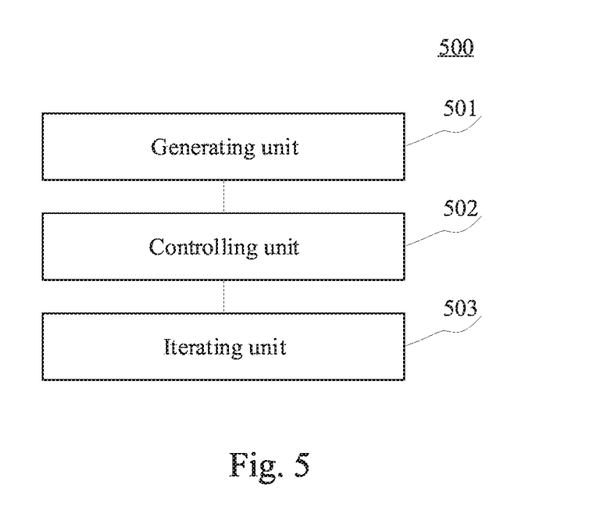
FIG. 5 is a schematic structural diagram of an apparatus for controlling vehicle driving according to an embodiment of the present disclosure.

Further referring to FIG. 5, as an implementation of the method shown in the above figures, an embodiment of the present disclosure provides an apparatus for controlling vehicle driving. An embodiment of the apparatus may correspond to an embodiment of the method shown in FIG. 2. The apparatus may be specifically applied to various electronic devices.

As shown in FIG. 5, the apparatus 500 for controlling vehicle driving of the present embodiment may include: a generating unit 501, a controlling unit 502, and an iterating unit 503. The generating unit 501 is configured to generate a global path of a driving site of a vehicle; the controlling unit 502 is configured to execute following controlling:

generating a local path of a site in front of a current position of the vehicle based on the global path, the local path following a direction of the global path, controlling the vehicle to drive along the local path until reaching an end point of the local path, determining whether the vehicle reaches an end point of the global path, and terminating the controlling in response to determining the vehicle reaching the end point of the global path; and the iterating unit 503 is configured to continue, in response to determining the vehicle failing to reach the end point of the global path, executing the controlling.

The related description of steps 201-204 in the corresponding embodiment of FIG. 2 may be referred to for specific processing of the generating unit 501, the controlling unit 502, and the iterating unit 503 of the apparatus 500 for controlling vehicle driving and the technical effects thereof in the present embodiment. The description will not be repeated here.

In some alternative implementations of the present embodiment, the generating unit 501 includes: a first acquiring subunit (not shown in the figure) configured to acquire a two-dimensional image of the driving site; a first generating subunit (not shown in the figure) configured to generate a global map based on the two-dimensional image of the driving site; and a second generating subunit (not shown in the figure) configured to perform path planning based on the global map, to generate the global path.

In some alternative implementations of the present embodiment, the controlling unit 502 includes: a second acquiring subunit (not shown in the figure) configured to acquire a two-dimensional image of the site in front of the current position of the vehicle; a third generating subunit (not shown in the figure) configured to generate a local map based on the two-dimensional image of the site in front of the current position of the vehicle; and a fourth generating subunit (not shown in the figure) configured to perform path planning based on the global path and the local map, to generate the local path.

In some alternative implementations of the present embodiment, the two-dimensional image of the driving site is obtained by a camera provided on an unmanned aerial vehicle through aerial photography, and the two-dimensional image of the site in front of the current position of the vehicle is obtained by a camera provided on the vehicle through photographing the site in front of the current position of the vehicle.

In some alternative implementations of the present embodiment, the controlling unit 502 further includes: a first determining subunit (not shown in the figure) configured to determine a speed sequence of a chassis of the vehicle for driving along the local path; and a controlling subunit (not shown in the figure) configured to control steering and displacement of the chassis based on the speed sequence, acquire a current road haul of the chassis from a chassis odometer of the vehicle in real time, and perform closed loop control based on a road haul corresponding to a current speed in the speed sequence and the current road haul, such that the chassis drives along the local path.

In some alternative implementations of the present embodiment, the controlling unit 502 further includes: a third acquiring subunit (not shown in the figure) configured to acquire the current road haul of the chassis and the two-dimensional image of the site in front of the current position of the vehicle; a fusing subunit (not shown in the figure) configured to fuse the current road haul of the chassis and the two-dimensional image of the site in front of the current position of the vehicle to determine the current position of the vehicle; and a second determining subunit (not shown in the figure) configured to determine whether the current position is identical to an end point position of the global path; determine the vehicle reaching the endpoint of the global path, in response to determining that the current position is identical to the end point position of the global path; and determine the vehicle failing to reach the endpoint of the global path, in response to determining that the current position is not identical to the end point position of the global path.

In some alternative implementations of the present embodiment, the local path meets at least one of the following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path.

In some alternative implementations of the present embodiment, the vehicle is an autonomous engineering vehicle.

Figure 6:
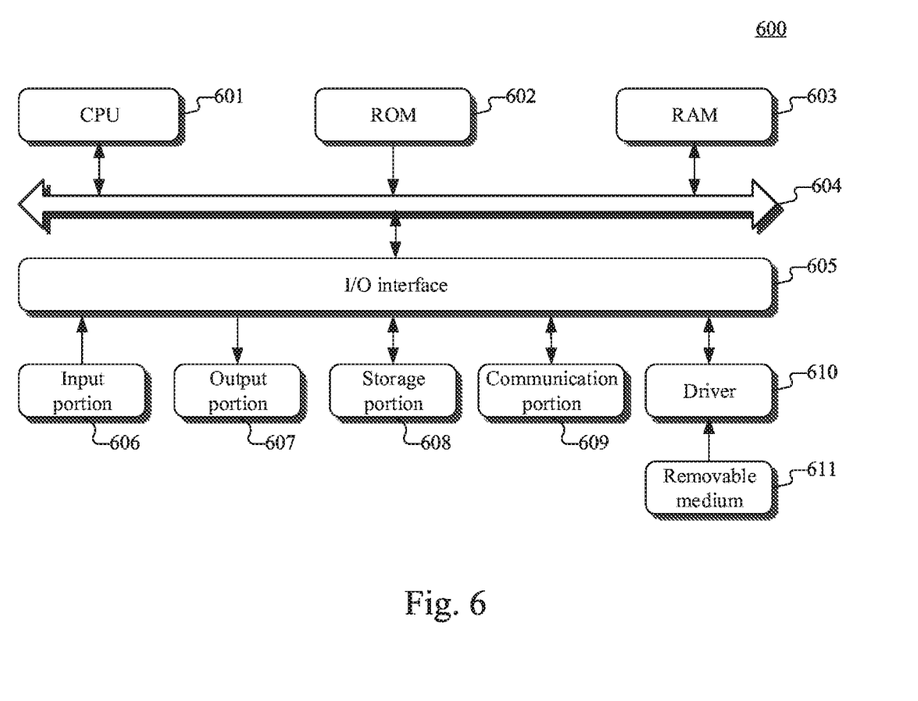
FIG. 6 is a schematic structural diagram of a computer system adapted to implement an electronic device of some embodiments of the present disclosure.

Referring to FIG. 6 below, a schematic structural diagram of a computer system 600 adapted to implement an electronic device (e.g., the server 103 in FIG. 1) of some embodiments of the present disclosure is shown. The electronic device shown in FIG. 6 is merely an example, and should not limit the functions and scope of use of some embodiments of the present disclosure.

As shown in FIG. 6, the computer system 600 includes a central processing unit (CPU) 601, which may execute various appropriate actions and processes in accordance with a program stored in a read only memory (ROM) 602 or a program loaded into a random access memory (RAM) 603 from a storage portion 608. The RAM 603 further stores various programs and data required by operations of the system 600. The CPU 601, the ROM 602, and the RAM 603 are connected to each other through a bus 604. An input/output (I/O) interface 605 is also connected to the bus 604.

The following components are connected to the I/O interface 605: an input portion 606 including a keyboard, a mouse, or the like; an output portion 607 including a cathode ray tube (CRT), a liquid crystal display device (LCD), a speaker, or the like; a storage portion 608 including a hard disk, or the like; and a communication portion 609 including a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610 as required, such that a computer program read therefrom is installed in the storage portion 608 as needed.

In particular, according to some embodiments of the present disclosure, the process described above with reference to the flow chart may be implemented in a computer software program. For example, an embodiment of the present disclosure includes a computer program product, which includes a computer program that is tangibly embedded in a computer readable medium. The computer program includes program codes for executing the method illustrated in the flow chart. In such an embodiment, the computer program may be downloaded and installed from a network via the communication portion 609, and/or may be installed from the removable medium 611. The computer program, when executed by the central processing unit (CPU) 601, implements the above functions defined by the methods of some embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flowcharts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware. The described units may also be provided in a processor, for example, described as: a processor including a generating unit, a controlling unit, and an iterating unit. The names of the units do not constitute a limitation to such units themselves in some cases. For example, the generating unit may be further described as "a unit configured to generate a global path of a driving site of a vehicle."

In another aspect, some embodiments of the present disclosure further provide a computer readable medium. The computer readable medium may be included in the electronic device described in the above embodiments, or a stand-alone computer readable medium without being assembled into the electronic device. The computer readable medium stores one or more programs. The one or more programs, when executed by the electronic device, cause the electronic device to: generate a global path of a driving site of a vehicle; execute following controlling: generating a local path of a site in front of a current position of the vehicle based on the global path, the local path following a direction of the global path, controlling the vehicle to drive along the local path until reaching an end point of the local path, determining whether the vehicle reaches an endpoint of the global path, and terminating the controlling if the vehicle reaches the end point of the global path; and continue, in response to determining the vehicle failing to reach the end point of the global path, executing the controlling.

The above description only provides explanation of embodiments and the employed technical principles of the present disclosure. It should be appreciated by those skilled in the art that the inventive scope of the present disclosure is not limited to the technical solutions formed by the particular combinations of the above-described technical features. The inventive scope should also cover other technical solutions formed by any combination of the above-described technical features or equivalent features thereof without departing from the inventive concept of the present disclosure, for example, technical solutions formed by interchanging the above-described features with, but not limited to, technical features with similar functions disclosed in the present disclosure.

What is claimed is:

1. A method for controlling vehicle driving, comprising:
generating a global path of a driving site of a vehicle;
executing following controlling: generating a local path of a site in front of a current position of the vehicle based on the global path, the local path following a direction of the global path, controlling the vehicle to drive along the local path until reaching an end point of the local path, determining whether the vehicle reaches an end point of the global path, and terminating the controlling in response to determining the vehicle reaching the end point of the global path; and continuing, in response to determining the vehicle failing to reach the end point of the global path, executing the controlling, wherein controlling the vehicle to drive along the local path until reaching an end point of the local path comprises:

determining a speed sequence of a chassis of the vehicle for driving along the local path, and a current speed in the speed sequence;

acquiring a current road haul of the chassis from a chassis odometer of the vehicle in real time, and determining whether the chassis deviates from the local path based on the acquired current road haul and the current speed; and in response to determining that the chassis deviates from the local path, controlling steering and displacement of the chassis based on the current speed until the chassis returns to the local path.

2. The method according to claim 1, wherein the generating a global path of a driving site of a vehicle comprises:

acquiring a two-dimensional image of the driving site;

generating a global map based on the two-dimensional image of the driving site; and performing path planning based on the global map, to generate the global path.

3. The method according to claim 2, wherein the generating a local path of a site in front of a current position of the vehicle based on the global path comprises:

acquiring a two-dimensional image of the site in front of the current position of the vehicle;

generating a local map based on the two-dimensional image of the site in front of the current position of the vehicle; and performing path planning based on the global path and the local map, to generate the local path.

4. The method according to claim 3, wherein the two-dimensional image of the driving site is obtained by a camera provided on an unmanned aerial vehicle through aerial photography, and the two-dimensional image of the site in front of the current position of the vehicle is obtained by a camera provided on the vehicle through photographing the site in front of the current position of the vehicle.

5. The method according to claim 1, wherein controlling steering and displacement of the chassis based on the current speed until the chassis returns to the local path comprises:

performing closed loop control based on a road haul corresponding to the current speed and the current road haul, such that the chassis drives along the local path.

6. The method according to claim 5, wherein the determining whether the vehicle reaches an end point of the global path comprises:

acquiring the current road haul of the chassis and the two-dimensional image of the site in front of the current position of the vehicle;

fusing the current road haul of the chassis and the two-dimensional image of the site in front of the current position of the vehicle to determine the current position of the vehicle;

determining whether the current position is identical to an end point position of the global path;

determining the vehicle reaching the end point of the global path, in response to determining that the current position is identical to the end point position of the global path; and determining the vehicle failing to reach the end point of the global path, in response to determining that the current position is not identical to the end point position of the global path.

7. The method according to claim 1, wherein the local path meets at least one of following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path.

8. The method according to claim 1, wherein the vehicle is an autonomous engineering vehicle.

9. An apparatus for controlling vehicle driving, comprising:

at least one processor; and a memory storing instructions, the instructions when executed by the at least one processor, cause the at least one processor to perform operations, the operations comprising:

generating a global path of a driving site of a vehicle;

executing following controlling: generating a local path of a site in front of a current position of the vehicle based on the global path, the local path following a direction of the global path, controlling the vehicle to drive along the local path until reaching an end point of the local path, determining whether the vehicle reaches an end point of the global path, and terminating the controlling in response to determining the vehicle reaching the end point of the global path; and continuing, in response to determining the vehicle failing to reach the end point of the global path, executing the controlling, wherein controlling the vehicle to drive along the local path until reaching an end point of the local path comprises:

determining a speed sequence of a chassis of the vehicle for driving along the local path, and a current speed in the speed sequence;

acquiring a current road haul of the chassis from a chassis odometer of the vehicle in real time, and determining whether the chassis deviates from the local path based on the acquired current road haul and the current speed; and in response to determining that the chassis deviates from the local path, controlling steering and displacement of the chassis based on the current speed until the chassis returns to the local path.

10. The apparatus according to claim 9, wherein the generating a global path of a driving site of a vehicle comprises:

acquiring a two-dimensional image of the driving site;

generating a global map based on the two-dimensional image of the driving site; and performing path planning based on the global map, to generate the global path.

11. The apparatus according to claim 10, wherein the generating a local path of a site in front of a current position of the vehicle based on the global path comprises:

acquiring a two-dimensional image of the site in front of the current position of the vehicle;

generating a local map based on the two-dimensional image of the site in front of the current position of the vehicle; and performing path planning based on the global path and the local map, to generate the local path.

12. The apparatus according to claim 11, wherein the two-dimensional image of the driving site is obtained by a camera provided on an unmanned aerial vehicle through aerial photography, and the two-dimensional image of the site in front of the current position of the vehicle is obtained by a camera provided on the vehicle through photographing the site in front of the current position of the vehicle.

13. The apparatus according to claim 12, wherein controlling steering and displacement of the chassis based on the current speed until the chassis returns to the local path comprises:
performing closed loop control based on a road haul corresponding to the current speed in the speed sequence and the current road haul, such that the chassis drives along the local path.

14. The apparatus according to claim 13, wherein the determining whether the vehicle reaches an end point of the global path comprises:
acquiring the current road haul of the chassis and the two-dimensional image of the site in front of the current position of the vehicle;
fusing the current road haul of the chassis and the two-dimensional image of the site in front of the current position of the vehicle to determine the current position of the vehicle; and
determining whether the current position is identical to an end point position of the global path; determining the vehicle reaching the end point of the global path, in response to determining that the current position is identical to the end point position of the global path; and determining the vehicle failing to reach the end point of the global path, in response to determining that the current position is not identical to the end point position of the global path.

15. The apparatus according to claim 9, wherein the local path meets at least one of following constraints: a deviation between an orientation of the vehicle on the local path and an orientation of the vehicle on the global path is within a preset deviation range, a distance of the local path deviating from the global path is within a preset distance range, or the vehicle does not collide with an obstacle in a process of driving along the local path.

16. The apparatus according to claim 9, wherein the vehicle is an autonomous engineering vehicle.

17. A non-transitory computer readable medium, storing a computer program thereon, wherein the computer program, when executed by a processor, causes the processor to perform operations, the operations comprising:
generating a global path of a driving site of a vehicle;
executing following controlling: generating a local path of a site in front of a current position of the vehicle based on the global path, the local path following a direction of the global path, controlling the vehicle to drive along the local path until reaching an end point of the local path, determining whether the vehicle reaches an end point of the global path, and terminating the controlling in response to determining the vehicle reaching the end point of the global path; and
continuing, in response to determining the vehicle failing to reach the end point of the global path, executing the controlling,
wherein controlling the vehicle to drive along the local path until reaching an end point of the local path comprises:
determining a speed sequence of a chassis of the vehicle for driving along the local path, and a current speed in the speed sequence;
acquiring a current road haul of the chassis from a chassis odometer of the vehicle in real time, and determining whether the chassis deviates from the local path based on the acquired current road haul and the current speed; and
in response to determining that the chassis deviates from the local path, controlling steering and displacement of the chassis based on the current speed until the chassis returns to the local path.

18. The method according to claim 1, wherein generating a global path of a driving site of a vehicle comprises:
acquiring a first two-dimensional image of the driving site, the two-dimensional image comprising an image of the vehicle;
performing three-dimensional reconstruction on the first two-dimensional image, to obtain a three-dimensional model of the driving site;
determining a position of the vehicle and a destination in the three-dimensional model of the driving site by performing an image recognition on the first two-dimensional image; and
annotating the three-dimensional model of the driving site based on the determined position, to generate the global map.

* * * * *